United States Patent
Zhang

(10) Patent No.: US 9,906,261 B2
(45) Date of Patent: Feb. 27, 2018

(54) RF DEVICE BASED ON BAND 28 AND COMMUNICATION METHOD THEREOF

(71) Applicant: HUIZHOU TCL MOBILE COMMUNICATION CO., LTD, Guangdong (CN)

(72) Inventor: Hua Zhang, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 15/313,902

(22) PCT Filed: Apr. 12, 2016

(86) PCT No.: PCT/CN2016/079020
§ 371 (c)(1),
(2) Date: Nov. 23, 2016

(87) PCT Pub. No.: WO2017/024806
PCT Pub. Date: Feb. 16, 2017

(65) Prior Publication Data
US 2017/0214428 A1    Jul. 27, 2017

(30) Foreign Application Priority Data
Aug. 7, 2015    (CN) .......................... 2015 1 0480937

(51) Int. Cl.
*H04B 1/68* (2006.01)
*H04B 1/44* (2006.01)
(Continued)

(52) U.S. Cl.
CPC ............. *H04B 1/50* (2013.01); *H04L 5/1423* (2013.01); *H04W 72/0453* (2013.01)

(58) Field of Classification Search
CPC ....................................................... H04B 1/50
(Continued)

(56) References Cited

U.S. PATENT DOCUMENTS

2014/0119244 A1    5/2014   Steer et al.
2014/0146716 A1*   5/2014   Chen .......................... H04L 5/16
                                                                370/277
(Continued)

FOREIGN PATENT DOCUMENTS

CN    101309087    11/2008
CN    105049078    11/2015

OTHER PUBLICATIONS

NTT DOCOMO, Inc., Proposal for Band28 test frequency and assignment in overlapped frequency, Nov. 9, 2012, Full text, 3GPP TSG RAN WG5 Meeting #57, Baltimore, USA.
(Continued)

*Primary Examiner* — Tilahun B Gesesse
(74) *Attorney, Agent, or Firm* — WPAT, PC

(57) ABSTRACT

A radio frequency (RF) device based on a frequency band "Band 28" and a communication method thereof are provided by the disclosure. The device includes a first duplexer for transceiving a first band signal, a second duplexer for transceiving a second band signal, a processor for selecting a corresponding one of the duplexers to transceive a signal by the channel switch according to a frequency band of the signal. An overlapping band belongs to a first band, frequency test points belong to a second band, a sum of frequency of the first band and the second band fall in Band 28. The second duplexer suppresses the overlapping band, so as to meet the requirement of full band of Band 28.

16 Claims, 2 Drawing Sheets

---

The processor determines frequency of a signal which is needed to transceive belonged to the first band or the second band. — S100

If belonged to the first band, the processor switching to the first duplexer to transceive the signal; if belonged to the second band, the processor switching to the second duplexer to transceiver the signal. — S200

(51) Int. Cl.
　　　*H04W 4/00*　　　(2018.01)
　　　*H04M 1/00*　　　(2006.01)
　　　*H04B 1/50*　　　(2006.01)
　　　*H04L 5/14*　　　(2006.01)
　　　*H04W 72/04*　　(2009.01)

(58) Field of Classification Search
　　　USPC .................................................... 455/46, 39
　　　See application file for complete search history.

(56) References Cited

U.S. PATENT DOCUMENTS

2015/0146582 A1* 5/2015 Galan ...................... H04B 1/44
　　　　　　　　　　　　　　　　　　　　　　　　　370/278
2016/0165609 A1* 6/2016 Konno .................. H04L 5/0044
　　　　　　　　　　　　　　　　　　　　　　　　　370/280

OTHER PUBLICATIONS

Zdeněk Kincl and Zdeněk Kolka, Test Frequency Selection for Band-Pass Filters, Apr. 21, 2010, Full text, 2010 20th International Conference, Czech Republic.
English abstract of 105049078, Zhang, Hua, Nov. 11, 2015.
English abstract of 101309087, Wang, Delian, et al Nov. 19, 2008.

* cited by examiner

RF DEVICE BASED ON BAND 28 AND COMMUNICATION METHOD THEREOF

CROSS REFERENCE TO RELATED APPLICATIONS

This application claims the priority of International Application No. PCT/CN2016/079020, filed on Apr. 12, 2016, which claims priority to Chinese Application No. CN201510480937.8, filed on Aug. 7, 2015. The entire disclosures of each of the applications are incorporated herein by reference.

BACKGROUND

1. Field of the Disclosure

The present disclosure relates to radio frequency (RF) communication technology, and more specifically to an RF device based on Band 28 and a communication method thereof.

2. Description

At present, the third Generation Partnership Project (3GPP) divides Band 28 (hereinafter referred as B28) into RX=758M-803 MHz and TX=703M-748 MHz. However, Band 28 and band of Digital Television (DTV) are very close, and lead an overlapping band. Shown as FIG. 1, B28_UL is for an uplink band, UL (uplink) means TX (transmit). B28_DL is for a downlink band, DL (downlink) means RX (receive). B20, B26, and B28 are different bands. In a Japanese band (JP) shown in FIG. 1, an overlap part between band of the DTV and the uplink band of B28 (B28_UL) is 703 MHz-710 MHz (shown as A). In an European Union band (EU), the overlap part of the downlink band of B28 (B28_DL) and the downlink band of B20 (B28_DL) is 791 MHz-803 MHz (shown as B). Due to large transmission power, noise interference that produced easily, the uplink band needs to suppress the overlap band. Meanwhile, whether the downlink band overlaps or not does not affect the transmission of the data.

Nowadays, common platforms all support full band of Band 28. Concerning operating costs, most terminal manufacturers produce mobile phones in the full band of Band 28. However, there is a very important testing item, called additional spectrum stray. In order to solve coexistence between band of DTV and B28, suppression ability of duplexes for B28 is particularly important in the range from 703 MHz to 710 MHz. And from March 2015, the additional spectrum stray of B28 has been listed as a default item by the certification body. Especially, upon a condition that 5M and 10M of NS-17 is bandwidth measured, the measured frequencies needs E-URA fall into the range from 718 MHz to 748 MHz, the test frequency points are 725.5 MHz (corresponding to the 5M) and 723 MHz (corresponding to the 10M).

As a radio frequency (RF) architecture shown in FIG. 2, an uplink band of the duplexer is 703 MHz-748 MHz, an overlap part covered band of the DTV is 703 MHz-710 MHz. upon a condition that the measure sweep band is 470M Hz-710 MHz, and the 470 MHz-710 MHz falls into Band 28, the duplexer cannot suppress for the range from 703 MHz to 710 MHz (if suppressed, the data of the frequency will be lost). Therefore, upon a condition that using the traditional RF test solution, the additional spectrum stray is very hard to implement because the overlap part cannot be suppressed.

Therefore, the prior art has to be improved and developed.

SUMMARY OF THE DISCLOSURE

To overcome the above-mentioned disadvantages, an object of the present disclosure is to provide a radio frequency (RF) device based on Band 28 and a communication method thereof. The main technological problem to be solved is how to suppress overlapping bands in the existing RF solutions, to avoid the difficulties of the additional spurious spectral.

To overcome the above-mentioned disadvantages, the technical schemes of the present disclosure are illustrated hereunder.

A radio frequency (RF) device, comprising a first duplexer, a second duplexer, and a processor, the processor configured to include a channel switch;

the first duplexer transceiving a first band signal, the second duplexer transceiving a second band signal, the processor selecting a corresponding one of the duplexers to transceive a signal by the channel switch according to a frequency band of the signal;

wherein an overlapping band between the first band signal and the second band signal belongs to a first band, frequency test points belong to a second band, the first band and the second band belong to a third band;

the first band comprises a first uplink band and a first downlink band, a starting frequency point of the first uplink band is equal to a starting frequency point of an uplink band of the third band, an end frequency point of the first uplink band is less than the frequency test points;

the second band comprises a second uplink band and a second downlink band, a starting frequency point of the second uplink band is greater than the end frequency point of the first uplink band a frequency point unit, an end frequency point of the second uplink band is equal to an end frequency point of the uplink band of the third band.

In the RF device, a starting frequency point of the first downlink band differs by a default value from the starting frequency point of the first uplink band;

a starting frequency point of a second downlink band differs by the default value from the starting frequency point of the second uplink band.

In the RF device, a difference value between the end frequency point of the first uplink band and the starting frequency point of the first uplink band is equal to a difference value between an end frequency point of the first downlink band and the starting frequency point of the first downlink band;

a difference value between the end frequency point of the second uplink band and the starting frequency point of the second uplink band is equal to a difference value between an end frequency point of the second downlink band and the starting frequency point of the second downlink band.

In the RF device, upon a condition that the uplink band of the third band is 703 MHz-748 MHz, a downlink band of the third band is 758 MHz-803 MHz, the overlapping band between the first band signal and the second band signal is 703 MHz-710 MHz, the frequency test points comprise 725.5 MHz and 723 MHz, the first uplink band is 703 MHz-722.5 MHz; the first downlink band is 758 MHz-777.5 MHz;

the second uplink band is 722.6 MHz-748 MHz, the second downlink is 777.6 MHz-803 MHz.

In the RF device, the third band is 758 MHz-803 MHz for downlink and 703 MHz-748 MHz for uplink, which is the frequency of Band 28.

In the RF device, comprising a first duplexer, a second duplexer, and a processor;

the first duplexer transceiving a first band signal, the second duplexer transceiving a second band signal, the processor selecting a corresponding one of the duplexers to transceive a signal by the channel switch according to a frequency band of the signal;

wherein an overlapping band between the first band signal and the second band signal belongs to a first band, frequency test points belong to a second band, the first band and the second band belong to a third band.

In the RF device, the first band comprises a first uplink band and a first downlink band, the second band comprises a second uplink band and a second downlink band;

a starting frequency point of the first uplink band is equal to a starting frequency point of an uplink band of the third band, an end frequency point of the first uplink band is less than the frequency test points;

a starting frequency point of the second uplink band is greater than the end frequency point of the first uplink band a frequency point unit, an end frequency point of the second uplink band is equal to an end frequency point of the uplink band of the third band;

a starting frequency point of the first downlink band differs by a default value from the starting frequency point of the first uplink band;

a starting frequency point of a second downlink band differs by the default value from the starting frequency point of the second uplink band.

In the RF device, a difference value between the end frequency point of the first uplink band and the starting frequency point of the first uplink band is equal to a difference value between an end frequency point of the first downlink band and the starting frequency point of the first downlink band;

a difference value between the end frequency point of the second uplink band and the starting frequency point of the second uplink band is equal to a difference value between an end frequency point of the second downlink band and the starting frequency point of the second downlink band.

In the RF device, upon a condition that the uplink band of the third band is 703 MHz-748 MHz, a downlink band of the third band is 758 MHz-803 MHz, the overlapping band between the first band signal and the second band signal is 703 MHz-710 MHz, the frequency test points comprise 725.5 MHz and 723 MHz, the first uplink band is 703 MHz-722.5 MHz; the first downlink band is 758 MHz-777.5 MHz;

the second uplink band is 722.6 MHz-748 MHz, the second downlink is 777.6 MHz-803 MHz.

In the RF device, the processor is configured to include a channel switch, and selects to the corresponding one of the duplexers to transceive the signal.

In the RF device, the third band is 758 MHz-803 MHz for downlink and 703 MHz-748 MHz for uplink, which is the frequency of Band 28.

The communication method, applied in an RF device, the RF device comprises a first duplexer, a second duplexer, and a processor, the first duplexer transceiving a first band signal, the second duplexer transceiving a second band signal, an overlapping band between the first band signal and the second band signal belongs to a first band, frequency test points belong to a second band, the first band and the second band belong to a third band, wherein the communication method comprises:

the processor determining a frequency of a signal, to be transceived, belongs to the first band or the second band;

if belonged to the first band, the processor switching to the first duplexer to transceive the signal;

if belonged to the second band, the processor switching to the second duplexer to transceive the signal.

In the communication method, the first band comprises a first uplink band and a first downlink band, the second band comprises a second uplink band and a second downlink band;

a starting frequency point of the first uplink band is equal to a starting frequency point of an uplink band of the third band, an end frequency point of the first uplink band is less than the frequency test points;

a starting frequency point of the second uplink band is greater than the end frequency point of the first uplink band a frequency point unit, an end frequency point of the second uplink band is equal to an end frequency point of the uplink band of the third band;

a starting frequency point of the first downlink band differs by a default value from the starting frequency point of the first uplink band;

a starting frequency point of a second downlink band differs by the default value from the starting frequency point of the second uplink band.

In the communication method, a difference value between the end frequency point of the first uplink band and the starting frequency point of the first uplink band is equal to a difference value between an end frequency point of the first downlink band and the starting frequency point of the first downlink band;

a difference value between the end frequency point of the second uplink band and the starting frequency point of the second uplink band is equal to a difference value between an end frequency point of the second downlink band and the starting frequency point of the second downlink band.

In the communication method, upon a condition that the uplink band of the third band is 703 MHz-748 MHz, a downlink band of the third band is 758 MHz-803 MHz, the overlapping band between the first band signal and the second band signal is 703 MHz-710 MHz, the frequency test points comprise 725.5 MHz and 723 MHz, the first uplink band is 703 MHz-722.5 MHz; the first downlink band is 758 MHz-777.5 MHz;

the second uplink band is 722.6 MHz-748 MHz, the second downlink is 777.6 MHz-803 MHz.

In the communication method, the third band is 758 MHz-803 MHz for downlink and 703 MHz-748 MHz for uplink, which is the frequency of Band 28.

Compared with the prior art, the RF device based on Band 28 and the communication method are provided by the present disclosure. The RF device comprises a first duplexer, a second duplexer, and a processor; the first duplexer is configured for transceiving a first band signal, the second duplexer is configured for transceiving a second band signal, the processor is configured for selecting a corresponding one of the duplexers to transceive a signal by the channel switch according to a frequency band of the signal. Wherein an overlapping band belongs to the first band, frequency test points belong to the second band, a sum of frequency of the first band and the second band fall in Band 28. The overlapping band is not belonged to bandwidth for the second duplexer, that is the second duplexer can suppress the overlapped band, thereby not only can solve the testing problem of additional spectrum stray, but also can meet the requirements of full band of Band 28.

DETAILED DESCRIPTION

The present disclosure provides a radio frequency (RF) device based on Band 28 and a communication method thereof. The RF device is applied to all the terminals using Band 28, such as mobile phones, tablet computers, vehicle-mounted BLUETOOTH, etc. The principle of the present disclosure is implemented in a suitable computing environment for illustrative purposes. The following description is based on the specific illustrated embodiment of the present disclosure, which should not be construed as limiting the present disclosure, unless otherwise specified.

Figure 1:
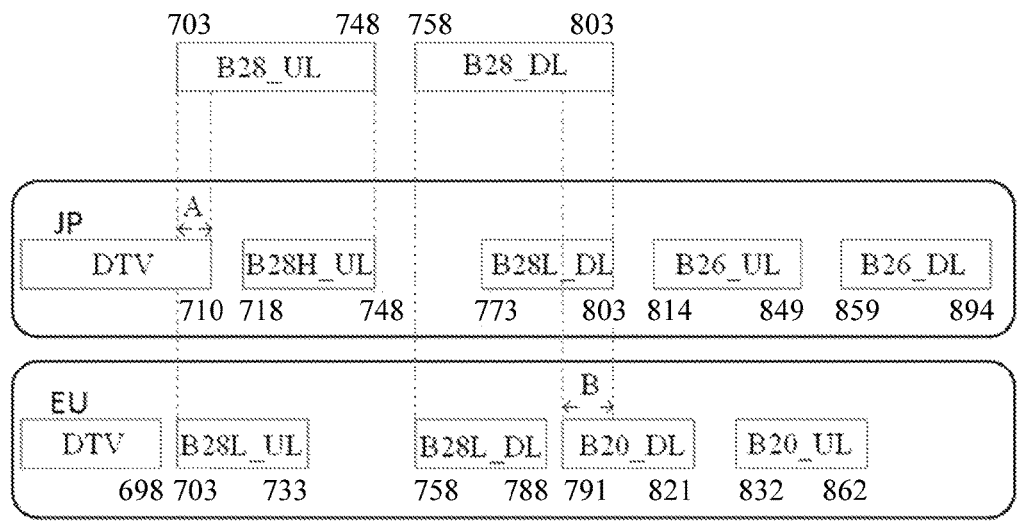
FIG. 1 is a distribution diagram showing a Band 28 and a band of DTV according to the prior art.
Figure 2:
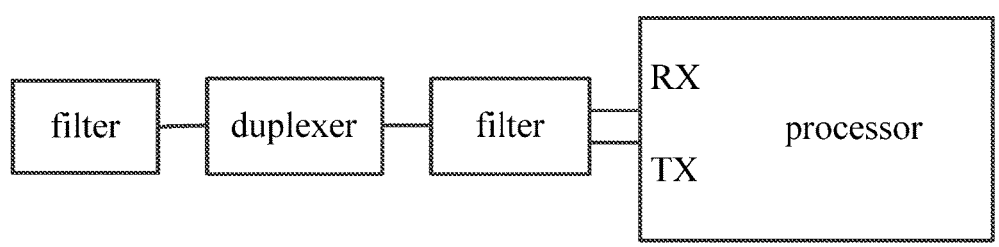
FIG. 2 is diagram showing a radio frequency (RF) architecture according to the prior art.
Figures 3, 4:
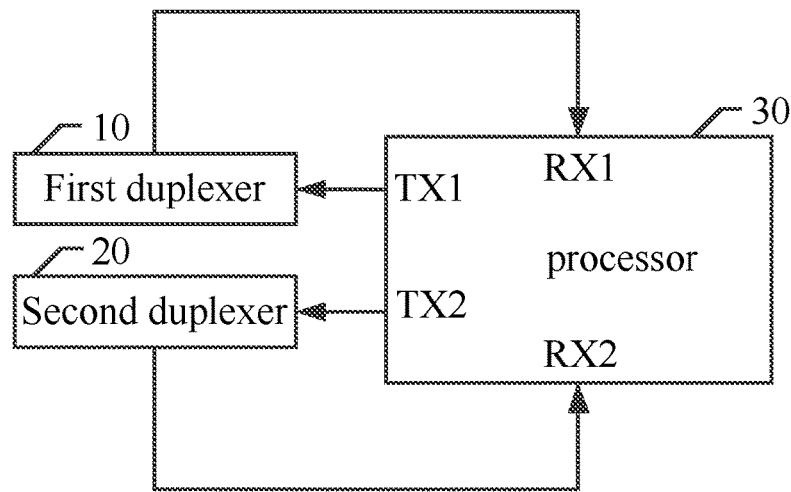
FIG. 3 is a schematic structural diagram showing an RF device based on Band 28 according to the present disclosure.
FIG. 4 is a flowchart of a communication method for the RF device based on Band 28 according to the present disclosure.

As shown in FIG. 3, the RF device provided by the present disclosure comprises a first duplexer 10, a second duplexer 20, and a processor 30. The first duplexer 10 is configured for transceiving a first band signal, and is connected to a first transmit port TX and a first receive port RX1 of the processor 30. The second duplexer 20 is configured for transceiving a second band signal, and is connected to a second transmit port TX2, and a receive port RX2 of the processor 30. The processor is configured for selecting a corresponding one of the duplexers to transceive a signal by the channel switch according to a frequency band of the signal.

The improved solution of the embodiment is an existing duplexer that is divided into two duplexers (the first duplexer 10 and the second duplexer 20), and an existing Band 28 is divided into two parts, to make the two duplexers cover the full band of Band 28. By setting range of the two duplexers, the overlapping band belongs to a first band, and frequency test points belong to a second band. That is to make the overlapping band (703 MHz-710 MHz) work in one duplexer, the frequency test points work in another duplexer. The overlapping duplexer does not belong to bandwidth of the another duplexer, so the another duplexer can suppress band 703 MHz-710 MHz. Thereby, this cannot only can solve the testing problem of additional spectrum stray, but also can meet the requirements of the full band of Band 28.

In the embodiment, the first band comprises a first uplink band UL1 and a first downlink band DL1, the second band comprises a second uplink band UL2 and a second downlink band DL2. The setting requirement of band in the embodiment is a starting frequency point of the first uplink band UL1 is equal to a starting frequency point of an uplink band of Band 28, and an end frequency point of the first uplink band UL1 is less than the frequency test points. A starting frequency point of the second uplink band UL2 is greater than the end frequency point of the first uplink band UL1 a frequency point unit, an end frequency point of the second uplink band UL2 is equal to an end frequency point of the uplink band of Band 28. The two starting frequency points of the downlink band differ by a default value (usually 55 MHz) from the starting frequency points of the uplink band. The greater the difference value between the end frequency point of the first uplink band and the starting frequency point of the first uplink band is closer to a difference value between an end frequency point of the first downlink band and the starting frequency point of the first downlink band. In a preferred embodiment, the two difference values are equal. In this case, the uplink band and the downlink band ranges similar or equally, thereby not only easy to set band, but also avoid one of them to be too narrow to transmit.

In the existing Band 28, the uplink band UL0 of Band 28 is 703 MHz-748 MHz, a downlink band DL0 is 758 MHz-803 MHz, the overlapping band is 703 MHz-710 MHz, the frequency test points comprise 725.5 MHz and 723 MHz. In the specific embodiment, the configuration may be:

The first duplexer 10: the first uplink band UL1 is 703 MHz-722.5 MHz, the first downlink band DL 758 MHz-777.5 MHz.

The second duplexer 20: the second uplink band UL2 is 722.6 MHz-748 MHz, the second downlink DL is 777.6 MHz-803 MHz.

UL1+UL2=UL0, DL1+DL2=DL0. The uplink band differs by 55 MHz from the downlink band, such as 758 MHz−703 MHz=55 MHz. 722.5 MHz differs by 722.6 MHz from a frequency point unit (0.1 MHz). The difference value between the end frequency point and the starting frequency point of the uplink band is equal to the difference value between an end frequency point and the starting frequency point of the downlink band. For example, the two difference values in the first duplexer 10 are both 19.5 MHz, and the two difference values are 25.4.

The frequency test points 725.5 MHz and 723 MHz are both worked in the second duplexer 20. For the second duplexer 20, the overlapping band 703 MHz-710 MHz does not belong to its bandwidth. Therefore, the second duplexer 20 can suppress band 703 MHz-710 MHz. Upon a condition that the additional spectrum stray of the NS-17 is tested, it not only can solve the testing problem of additional spectrum stray, but also can meet the requirements of full band of Band 28.

It should be understood, if the exiting Band 28, the overlapping band, or the frequency test points are changed, the first duplexer and the second duplexer in the embodiment will be changed according to the above requirements.

The processor 30 is configured to include a channel switch, for selecting a corresponding one of the duplexers to transceive the signal.

Upon a condition that the signal needs to be transmitted, the processor determines which duplexer the signal frequency belongs to, and controls the channel switch to switch a corresponding transmit port (connected to the first transmit port TX1 or the second transmit port TX2), and thereby selecting a corresponding duplexer to transceive.

Upon a condition that the signal needs to be received, a station will communicate with the processor, to inform the processor about the signal frequency. Therefore, the processor can select a corresponding one of the duplexers to transceive a signal by the channel switch according to a frequency band of the signal.

Upon a condition that the RF device is not working, the channel switch will be suspended, and the two duplexer will be disconnected from the processor.

Based on the RF device based on Band 28, the present disclosure also provides a communication method, applied in an RF device based on Band 28. As shown in FIG. 4, the communication method comprises:

In step S100, the processor determines a frequency of a signal, to be transceived, belongs to the first band or the second band.

In step S200, if the frequency of the signal belongs to the first band, the processor switches to the first duplexer to transceive the signal. If the frequency of the signal belongs to the second band, the processor switches to the second duplexer to transceive the signal.

In conclusion, the improvement of the present disclosure divides an existing duplexer into two duplexers, and divides an existing Band 28 into two parts which are set on the two duplexers separately. That is to make the overlapping band work in one duplexer, the frequency test points work in another duplexer. In this situation, the overlapping band does not belong to bandwidth of the another duplexer, so the another duplexer can suppress band 703 MHz-710 MHz. Thereby, this not only can solve the testing problem of additional spectrum stray, but also can meet the requirements of the full band of Band28.

It should be understood that the present disclosure has been described with reference to certain preferred and alternative embodiment which are intended to be exemplary only and do not limit the full scope of the present disclosure as set forth in the appended claims.

What is claimed is:

1. A radio frequency (RF) device, comprising a first duplexer, a second duplexer, and a processor, wherein the processor is configured to include a channel switch; wherein
the first duplexer is configured to transceive a signal within a first frequency band, the second duplexer is configured to transceive a signal within a second frequency band, the processor is configured to select a corresponding one of the duplexers by the channel switch to transceive a signal according to a frequency band to which the signal belongs;
wherein an overlapping frequency band is defined between the first frequency band and the second frequency band and belongs to the first frequency band, a plurality of frequency test points are defined and belong to the second frequency band, the first frequency band and the second frequency band belong to a third frequency band;
wherein the first frequency band comprises a first uplink band and a first downlink band; a starting frequency point of the first uplink band is equal to a starting frequency point of an uplink band of the third frequency band, an end frequency point of the first uplink band is less than the frequency test points;
the second frequency band comprises a second uplink band and a second downlink bands; a starting frequency point of the second uplink band is greater than the end frequency point of the first uplink band by a frequency point unit; an end frequency point of the second uplink band is equal to an end frequency point of the uplink band of the third frequency band.

2. The RF device as claimed in claim 1, wherein
a starting frequency point of the first downlink band differs by a default value from the starting frequency point of the first uplink band;
a starting frequency point of a second downlink band differs by the default value from the starting frequency point of the second uplink band.

3. The RF device as claimed in claim 1, wherein
a difference value between the end frequency point of the first uplink band and the starting frequency point of the first uplink band is equal to a difference value between an end frequency point of the first downlink band and a starting frequency point of the first downlink band;
a difference value between the end frequency point of the second uplink band and the starting frequency point of the second uplink band is equal to a difference value between an end frequency point of the second downlink band and a starting frequency point of the second downlink band.

4. The RF device as claimed in claim 3, wherein
upon a condition that the uplink band of the third frequency band is 703 MHz-748 MHz, a downlink band of the third frequency band is 758 MHz-803 MHz, the overlapping frequency band between the first frequency band and the second frequency band is 703 MHz-710 MHz, and the frequency test points comprise 725.5 MHz and 723 MHz,
the first uplink band is 703 MHz-722.5 MHz; the first downlink band is 758 MHz-777.5 MHz;
the second uplink band is 722.6 MHz-748 MHz; the second downlink is 777.6 MHz-803 MHz.

5. The RF device as claimed in claim 1, wherein the third frequency band is 758 MHz-803 MHz for downlink and 703 MHz-748 MHz for uplink.

6. A radio frequency (RF) device, comprising a first duplexer, a second duplexer, and a processor; wherein
the first duplexer is configured to transceive a signal within a first frequency band, the second duplexer is configured to transceive a signal within a second frequency band, the processor is configured to select a corresponding one of the duplexers to transceive a signal according to a frequency band to which the signal belongs;
wherein an overlapping frequency band is defined between the first frequency band and the second frequency band and belongs to the first frequency band, a plurality of frequency test points are defined and belong to the second frequency band, the first frequency band and the second frequency band belong to a third frequency band.

7. The RF device as claimed in claim 6, wherein the first frequency band comprises a first uplink band and a first downlink band, the second frequency band comprises a second uplink band and a second downlink band;
a starting frequency point of the first uplink band is equal to a starting frequency point of an uplink band of the third frequency band, an end frequency point of the first uplink band is less than the frequency test points;
a starting frequency point of the second uplink band is greater than the end frequency point of the first uplink band by a frequency point unit an end frequency point of the second uplink band is equal to an end frequency point of the uplink band of the third frequency band;
a starting frequency point of the first downlink band differs by a default value from the starting frequency point of the first uplink band;
a starting frequency point of a second downlink band differs by the default value from the starting frequency point of the second uplink band.

8. The RF device as claimed in claim 7, wherein
a difference value between the end frequency point of the first uplink band and the starting frequency point of the first uplink band is equal to a difference value between an end frequency point of the first downlink band and the starting frequency point of the first downlink band;
a difference value between the end frequency point of the second uplink band and the starting frequency point of the second uplink band is equal to a difference value between an end frequency point of the second downlink band and the starting frequency point of the second downlink band.

9. The RF device as claimed in claim 8, wherein
upon a condition that the uplink band of the third frequency band is 703 MHz-748 MHz, a downlink band of the third frequency band is 758 MHz-803 MHz, the overlapping band between the first frequency band and the second frequency band is 703 MHz-710 MHz, and the frequency test points comprise 725.5 MHz and 723 MHz,
the first uplink band is 703 MHz-722.5 MHz; the first downlink band is 758 MHz-777.5 MHz;
the second uplink band is 722.6 MHz-748 MHz; the second downlink is 777.6 MHz-803 MHz.

10. The RF device as claimed in claim 6, wherein the processor is configured to include a channel switch, and to select the corresponding one of the duplexers to transceive the signal.

11. The RF device as claimed in claim 6, wherein the third frequency band is 758 MHz-803 MHz for downlink and 703 MHz-748 MHz for uplink.

12. A communication method, applied in an radio frequency (RF) device, wherein the RF device comprises a first duplexer, a second duplexer, and a processor, wherein the first duplexer is configured to transceive a signal within a first frequency band, the second duplexer is configured to transceive a signal within a first frequency band, an overlapping frequency band is defined between the first frequency band and the second frequency band and belongs to the first frequency band, a plurality of frequency test points belong to the second frequency band, the first frequency band and the second frequency band belong to a third frequency band, wherein the communication method comprises:
the processor determining a frequency of a signal to be transceived belongs to the first frequency band or the second frequency band;
if the frequency of the signal belonging to the first frequency band, the processor switching to the first duplexer to transceive the signal;
if the frequency of the signal belonging to the second frequency band, the processor switching to the second duplexer to transceive the signal.

13. The communication method as claimed in claim 12, wherein the first frequency band comprises a first uplink band and a first downlink band, the second frequency band comprises a second uplink band and a second downlink band;
a starting frequency point of the first uplink band is equal to a starting frequency point of an uplink band of the third frequency band, an end frequency point of the first uplink band is less than the frequency test points;
a starting frequency point of the second uplink band is greater than the end frequency point of the first uplink band by a frequency point unit, an end frequency point of the second uplink band is equal to an end frequency point of the uplink band of the third frequency band;
a starting frequency point of the first downlink band differs by a default value from the starting frequency point of the first uplink band;
a starting frequency point of a second downlink band differs by the default value from the starting frequency point of the second uplink band.

14. The communication method as claimed in claim 13, wherein
a difference value between the end frequency point of the first uplink band and the starting frequency point of the first uplink band is equal to a difference value between an end frequency point of the first downlink band and the starting frequency point of the first downlink band;
a difference value between the end frequency point of the second uplink band and the starting frequency point of the second uplink band is equal to a difference value between an end frequency point of the second downlink band and the starting frequency point of the second downlink band.

15. The communication method as claimed in claim 14, wherein
upon a condition that the uplink band of the third frequency band is 703 MHz-748 MHz, a downlink band of the third frequency band is 758 MHz-803 MHz, the overlapping frequency band between the first frequency band and the second frequency band is 703 MHz-710 MHz, and the frequency test points comprise 725.5 MHz and 723 MHz,
the first uplink band is 703 MHz-722.5 MHz; the first downlink band is 758 MHz-777.5 MHz;
the second uplink band is 722.6 MHz-748 MHz; the second downlink is 777.6 MHz-803 MHz.

16. The communication method as claimed in claim 12, wherein the third frequency band is 758 MHz-803 MHz for downlink and 703 MHz-748 MHz for uplink.

* * * * *